July 18, 1939.  J. W. OVERBEKE  2,166,875
DISK TYPE VALVE
Filed Nov. 14, 1938  2 Sheets-Sheet 1
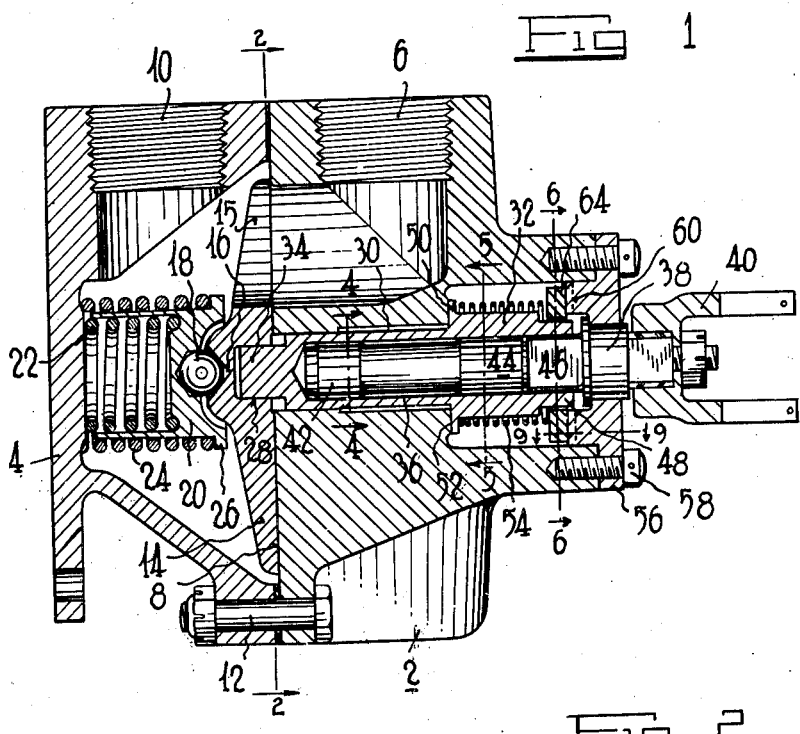
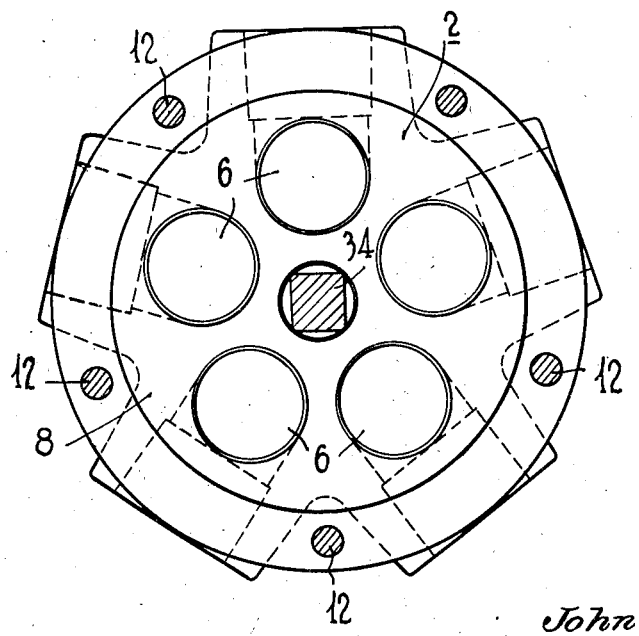
INVENTOR.
John W. Overbeke,
BY Harrison Bates
ATTORNEY.

July 18, 1939.  J. W. OVERBEKE  2,166,875

DISK TYPE VALVE

Filed Nov. 14, 1938  2 Sheets-Sheet 2

Inventor
John W. Overbeke,
By Harrison Bales
Attorney

Patented July 18, 1939

2,166,875

UNITED STATES PATENT OFFICE 2,166,875

DISK TYPE VALVE

John W. Overbeke, Anneslie, Md., assignor to The Glenn L. Martin Company, Baltimore, Md.

Application November 14, 1938, Serial No. 240,423

13 Claims. (Cl. 251—90)

The invention relates to a disk type valve, and particularly to such a valve intended for use in the fuel lines of aircraft.

The first object of the invention is to provide a valve for selectively connecting one port with one or more of a group of other ports which does not require the use of packing glands, but yet which is simple and at the same time fluid tight.

The second object of the invention is to provide a valve of this nature in which friction is avoided while a tight seal is maintained, these results being accomplished by the elimination of the packing glands.

A further object of the invention is to provide a valve of this type in which use is made of a floating member which connects the operating member and a movable element of the valve, and is movable with respect to both of these members.

A further object of the invention is to utilize such floating member to give a secondary seal, supplemental to the primary seal provided by the movable valve element itself.

A further object of the invention is to utilize a single spring to accomplish the functions both of applying the floating member on its seat to act as a secondary seal and applying pressure against a movable element of a positioning mechanism which serves to hold the valve in various selected positions.

A further object of the invention is to provide a novel mounting for a valve disk which insures tightness thereof.

Still another object of the invention is to provide a mounting of the valve disk which is balanced in such a manner as to prevent improper displacement of the valve out of its normal plane of operation, this being accomplished by the use of two coil springs one within the other.

Further objects and advantages of the invention will appear more fully from the following description, particularly when taken in conjunction with the accompanying drawings.

In the drawings:

Fig. 1 is a cross section through a valve according to the invention;

Fig. 2 is a cross section on the line 2—2 of Fig. 1;

Figure 4:
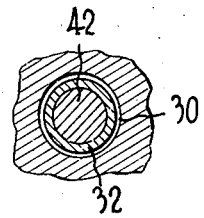
Figure 5:
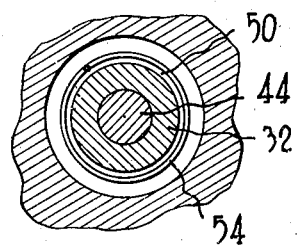
Figure 9:
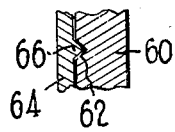
Figure 6:
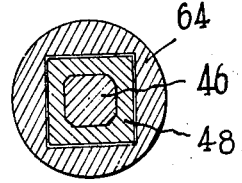
Figure 8:
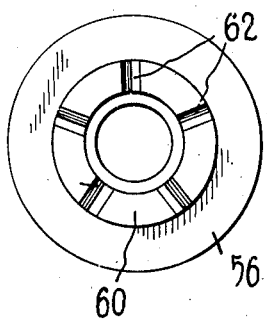
Figure 7:
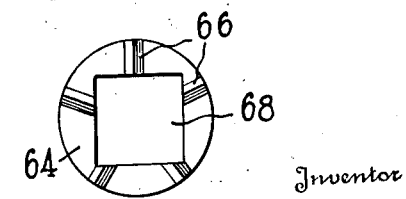

Figs. 4, 5 and 6 are cross sections on the lines 4—4, 5—5 and 6—6 respectively of Fig. 1;

Fig. 7 is a plan view of the movable element of the positioning mechanism;

Fig. 8 is a plan view of the stationary element thereof;

Fig. 9 is a cross section on the line 9—9 of Fig. 1.

The invention, as will appear from the complete description thereof, is applicable to many purposes, wherever it is desired to connect selectively one or more passages to one or more other passages. The valve specifically disclosed is intended for use in aircraft for connecting any one of five fuel tanks to the fuel line leading to the engine or engines.

The valve comprises a casing formed in two parts, an inlet part 2 and an outlet part 4. The inlet part 2 has five inlet openings 6 each terminating in the inner plane face 8 of the inlet section 2. The outlet section 4 has a single outlet 10. The inlet and outlet sections are secured together by suitable bolts 12.

Figure 3:
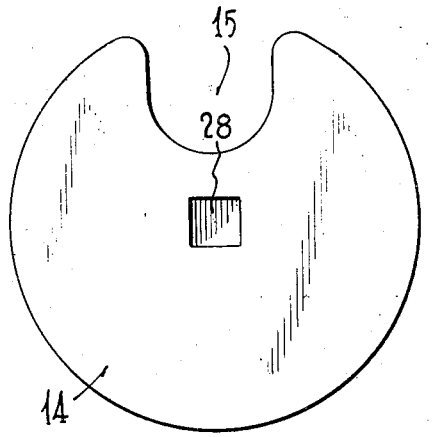
Fig. 3 is a bottom plan view of the valve disk.

The movable element of the valve comprises a disk 14 (see Fig. 3). This disk has a flat face resting against the flat surface 8 of the inlet section 2 of the valve body. The disk is in the form of a circle provided with a cutout 15 arranged to overlie one of the inlet passages 6. It will be evident that as the valve disk 14 is turned it will connect the inlets 6 selectively to the inside of the outlet section 4 and thus to the outlet passage 10. Furthermore, the central portion of the disk 14 resting against the central portion of the flat surface 8 will prevent leakage of fuel or other fluid out of the chamber 4 into the bore 30.

In order to hold the valve disk 14 tightly in engagement with the surface 8, the disk is provided at its center with a conical recess 16 in which is engageable a ball 18 seated in a recess in a cup-shaped member 20. Cup-shaped member 20 is pressed in the direction of the face 8 by two coil springs 22 and 24 located respectively inside and outside the cup-shaped member, the outer spring resting against a flange 26. Both springs rest against the wall of outlet member 4.

I have found that the use of two coil springs one within the other in this relation serves to exert a balanced force against the ball 18 and thereby against the disk 14, so that there is no unbalanced force exerted such as might tend to displace the valve from its normal plane of operation and thus permit leakage therethrough.

In order to turn the valve disk 14, it is provided in its flat face with a square or other polygonal opening 28, which is opposite a central bore 30 in the inlet member 2. Within this bore 30 is arranged a floating sleeve member 32, having a square head 34 fitting in the hole 28 so as to secure the sleeve and the valve disk together for joint turning movement. The sleeve 32 in turn is provided with a bore 36 into which extends the operating member 38 adapted to be turned manually or otherwise by a fork 40. Operating member 38 has two spaced round portions 42 and 44 fitting in the bore 36, which is likewise round in this portion, so as to give a bearing between the operating member and the sleeve. Operating member 38 also has a squared portion 46 which fits in an internally and externally squared section 48 of the sleeve. Thus the sleeve is locked to the operating member 38 for turning therewith, but at the same time is free to move axially with respect to the operating member.

Sleeve 32 carries a flange 50 engageable with a seat 52 of the bore 30. A coil spring 54 engages the other face of flange 50 and thus urges it against the seat 52. The engagement of flange 50 with the seat 52 provides a secondary seal so that any fluid which might leak between disk 14 and surface 8 into the bore 30 is prevented from leaking further by this secondary seal.

The end of the bore 30 is closed by a member 56 through which the operating member 38 extends and within which such operating member is turnable. This member is secured to the inlet section 2 by screws 58. It is provided with an annular ridge 60, in the annular face of which are arranged five notches 62, spaced angularly in correspondence with the spacing of the five inlets 6. Engageable against this face is a disk 64 having thereon five projections 66 which can fit into the notches 62. Disk 64 has a square hole 68 therein which engages over a squared end portion 48 of the sleeve 32. Disk 64 can thus turn with sleeve 32, while being slidable thereon. Coil spring 54 rests against the disk 64 and thus presses it into engagement with the annular portion 60 of closure member 56.

With the above construction in mind, it will be apparent that upon the turning of the fork 40 this turning motion will be transmitted to the valve disk 14 through operating member 38 and sleeve 32. However, axial movement of the operating member 38, or of disk 14, will not affect the sleeve 32 since the same is free to move axially with respect to both the operating member and the disk. The sleeve therefore through flange 50 engaging with seat 52 will always keep a seal to prevent the leakage of fluid from the valve.

When the fork 40 is turned, projections 66 will engage in notches 62 and thus will serve to hold the valve disk 14 in any one of the five positions in which it admits fluid from one of the inlets 6 to the outlet 10.

While I have described herein one embodiment of my invention, I wish it to be understood that I do not intend to limit myself thereby except within the scope of the appended claims.

I claim:

1. In a valve for controlling the flow of fluid, inlet and outlet portions having inlet and outlet passages respectively, one of said portions having a seating surface, a valve member engageable against said seating surface and rotatable about an axis for controlling communication between said inlet and outlet passages, an operating member mounted in one of said portions rotatable about the same axis, and a member mounted in one of said portions for rotation about the same axis operatively connecting said operating member and said valve member, said connecting member being movable in the direction of said axis with respect to both said operating member and said valve member, and being located outside the path of fluid flowing through said inlet and outlet passages.

2. In a valve, inlet and outlet members, means connecting said members together, said inlet member having a flat face and having an inlet passage terminating in an opening in said flat face, said outlet member having a chamber opposite said flat face and an outlet passage connected to said chamber, said inlet member having a bore therethrough perpendicular to said flat face, a valve disk having a flat face engaging the flat face of the inlet member and having a portion thereof cut away adapted to register with said inlet opening, means to hold said valve disk against said flat face, said valve disk having an opening therein opposite said bore, a sleeve in said bore having means engaging in said opening to connect said sleeve to said valve disk while permitting said sleeve to move in the direction of the axis of said bore with respect to said valve disk, said sleeve having a bore therein coaxial with said first bore, an operating member extending into said second bore, said second bore having a square portion adjacent the outer end thereof, said operating member having a square portion engaging in the square portion of said sleeve, whereby to connect said sleeve to said operating member for turning movement therewith while permitting said sleeve to move with respect to said operating member in the direction of the axis of the bore, and means to turn said operating member, said first bore having a shoulder therein, said sleeve having a flange engageably with said shoulder, a member fixed to said inlet member and having a plurality of notches therein, a movable element opposite said last member, the end of said sleeve being square, said movable element having a square opening therein engaging the square end of said sleeve, said movable element having projections engageable with said notches, and a coil spring between said movable element and said flange on the sleeve adapted to press the movable element against said member and to press the flange against the shoulder of the bore.

3. In a valve, inlet and outlet members, means connecting said members together, said inlet member having a flat face and having an inlet passage terminating in an opening in said flat face, said outlet member having a chamber opposite said flat face and an outlet passage connected to said chamber, said inlet member having a bore therethrough perpendicular to said flat face, a valve disk having a flat face engaging the flat face of the inlet member and having a portion thereof cut away adapted to register with said inlet opening, means to hold said valve disk against said flat face, said valve disk having an opening therein opposite said bore, a sleeve in said bore having means engaging in said opening to connect said sleeve to said valve disk while permitting said sleeve to move in the direction of the axis of said bore with respect to said valve disk, said sleeve having a bore therein coaxial with said first bore, an operating member extending into said second bore, said second bore having a square portion adjacent the outer end thereof, said operating member having a square portion engaging in the square portion of said bore, whereby to connect said sleeve to said operating member for turning movement therewith while permitting said sleeve to move with respect to said operating member in the direction of the axis of the bore, means to turn said operating member, said first bore having a shoulder therein, said sleeve having a flange engageable with said shoulder, and a coil spring engaging said flange on the sleeve adapted to press the flange against the shoulder of the bore.

4. In a valve, inlet and outlet members, means connecting said members together, said inlet member having a flat face and having an inlet passage terminating in an opening in said flat face, said outlet member having a chamber opposite said flat face and an outlet passage connected to said chamber, said inlet member having a bore therethrough perpendicular to said flat face, a valve disk having a flat face engaging the flat face of the inlet member and having a portion thereof cut away adapted to register with said inlet opening, means to hold said valve disc against said flat face, said valve disk having an opening therein opposite said bore, a sleeve in said bore having means engaging in said opening to connect said sleeve to said valve disk while permitting said sleeve to move in the direction of the axis of said bore with respect to said valve disk, said sleeve having a bore therein coaxial with said first bore, an operating member extending into said second bore, said second bore having a square portion adjacent the outer end thereof, said operating member having a square portion engaging in the square portion of said bore, whereby to connect said sleeve to said operating member for turning movement therewith while permitting said sleeve to move with respect to said operating member in the direction of the axis of the bore, means to turn said operating member, said first bore having a shoulder therein, said sleeve having a flange engageable with said shoulder, a member fixed to said inlet member and having a plurality of notches therein, a movable element opposite said last member, the end of said sleeve being square, said movable element having a square opening therein engaging the square end of said sleeve, said movable element having projections engageable with said notches, and a coil spring between said movable element and said flange on the sleeve adapted to press the movable element against said member and to press the flange against the shoulder of the bore.

5. In a valve, inlet and outlet members, one of said members having a seating face and having a passage terminating in an opening in said seating face, the other member having a chamber opposite said seating face and a passage connected to said chamber, one of said members having a bore therethrough transverse to said seating face, a valve disk having a face engaging the seating face and having a portion thereof cut away adapted to register with said opening, means to hold said valve disk against said seating face, a sleeve in said bore, means to connect said sleeve to said valve disk while permitting said sleeve to move in the direction of the axis of said bore with respect to said valve disk, said sleeve having a bore therein coaxial with said first bore, an operating member extending into said second bore, means to connect said sleeve to said operating member for turning movement therewith while permitting said sleeve to move with respect to said operating member in the direction of the axis of the bore, means to turn said operating member, said first bore having a shoulder therein, said sleeve having a flange engageable with said shoulder, and spring means engaging said flange on the sleeve adapted to press the flange against the shoulder of the bore.

6. In a valve, an inlet member and an outlet member, means connecting said members together, said inlet member having a flat face and having a plurality of inlet passages terminating in openings in said flat face, said outlet member having a chamber opposite said flat face and an outlet passage connected to said chamber, said inlet member having a bore therethrough perpendicular to said flat face, a valve disk having a flat face engaging the flat face of the inlet member and having a portion thereof cut away adapted to register with said inlet openings, means to hold said valve disk against said flat face, said valve disk having a polygonal opening therein opposite said bore, a sleeve in said bore having a polygonal end engaging in said opening, whereby to connect said sleeve to said valve disk while permitting said sleeve to move in the direction of the axis of said bore with respect to said valve disk, said sleeve having a bore therein coaxial with said first bore, an operating member extending into said second bore, said second bore having a round portion and a square portion adjacent the outer end thereof, said operating member having spaced round portions engaging in the round portions of said sleeve and having a square portion engaging in the square portion of said sleeve, whereby to connect said sleeve to said operating member for turning movement therewith while permitting said sleeve to move with respect to said operating member in the direction of the axis of the bore, means to turn said operating member, said first bore having a shoulder therein, said sleeve having a flange engageable with said shoulder, a member fixed to said inlet member and having a plurality of notches therein, a movable element opposite said last member, the end of said sleeve being square, said movable element having a square opening therein engaging the square end of said sleeve, said movable element having projections engageable with said notches, and a coil spring between said movable element and said flange on the sleeve adapted to press the movable element against said member and to press the flange against the shoulder of the bore.

7. In a valve, an inlet portion and an outlet portion, said inlet portion having a flat seating surface, a valve disk engageable against said seating surface and rotatable about an axis, an operating member mounted in said inlet portion rotatable about the same axis, and a sleeve rotatable about the same axis operatively connecting said operating member and said valve disk, said sleeve being movable in the direction of said axis with respect to both said operating member and said valve disk, means to press said valve disk against said seat comprising a cup-like member having means engaging said valve disk, and coil springs inside and outside said cup-shaped member pressing the same in the direction of said seat.

8. In a valve comprising a seat and a valve disk engageable against said seat, means to press said disk against said seat comprising a cup-like member having means engaging said valve disk, and coil springs inside and outside said cup-like member pressing the same in the direction of said seat.

9. In a valve comprising a flat seat and a valve disk engageable against said seat, means to press said disk against said seat, said seat having a conical recess therein, a ball engaging in said recess, a cup-like member having a seat therein engaging said ball, and coil springs inside and outside said cup-like member pressing the same in the direction of said seat.

10. In a valve as claimed in claim 1, sealing means carried by said connecting member to prevent fluid leakage from said valve.

11. In a valve as claimed in claim 1, sealing means carried by said connecting member to prevent fluid leakage from said valve, and means pressing said connecting member in a direction to hold said sealing means tight.

12. In a valve, inlet and outlet members, one of said members having a seating face and having a passage terminating in an opening in said seating face, the other member having a chamber opposite said seating face and a passage connected to said chamber, one of said members having a bore therethrough transverse to said seating face, a valve disk having a face engaging the seating face and having a portion thereof cut away adapted to register with said opening, means to hold said valve disk against said seating face, a sleeve in said bore, means to connect said sleeve to said valve disk while permitting said sleeve to move in the direction of the axis of said bore with respect to said valve disk, said sleeve having a bore therein coaxial with said first bore, and operating member extending into said second bore, means to connect said sleeve to said operating member for turning movement therewith while permitting said sleeve to move with respect to said operating member in the direction of the axis of the bore, and means to turn said operating member.

13. In a valve, inlet and outlet members, one of said members having a seating face and having a passage terminating in an opening in said seating face, the other member having a chamber opposite said seating face and a passage connected to said chamber, one of said members having a bore therethrough transverse to said seating face, a valve disk having a face engaging the seating face and having a portion thereof cut away adapted to register with said opening, means to hold said valve disk against said seating face, a sleeve turnably mounted in said bore and engaging at least a portion of the walls thereof, means to connect said sleeve to said valve disk while permitting said sleeve to move in the direction of the axis of said bore with respect to said valve disk, said sleeve having a bore therein coaxial with said first bore, an operating member extending into said second bore, means to connect said sleeve to said operating member for turning movement therewith while permitting said sleeve to move with respect to said operating member in the direction of the axis of the bore, means to turn said operating member, said first bore having a seat therein, said sleeve having a portion engageable with said seat, and means to press the last said portion against the seat of the bore.

JOHN W. OVERBEKE.